Oct. 2, 1962   E. V. GARNETT   3,056,510
DERRICK FOR VEHICLES

Filed April 28, 1958   14 Sheets-Sheet 1

INVENTOR.
EDWARD V. GARNETT
BY
Horace B. Van Valkenburgh
ATTORNEY

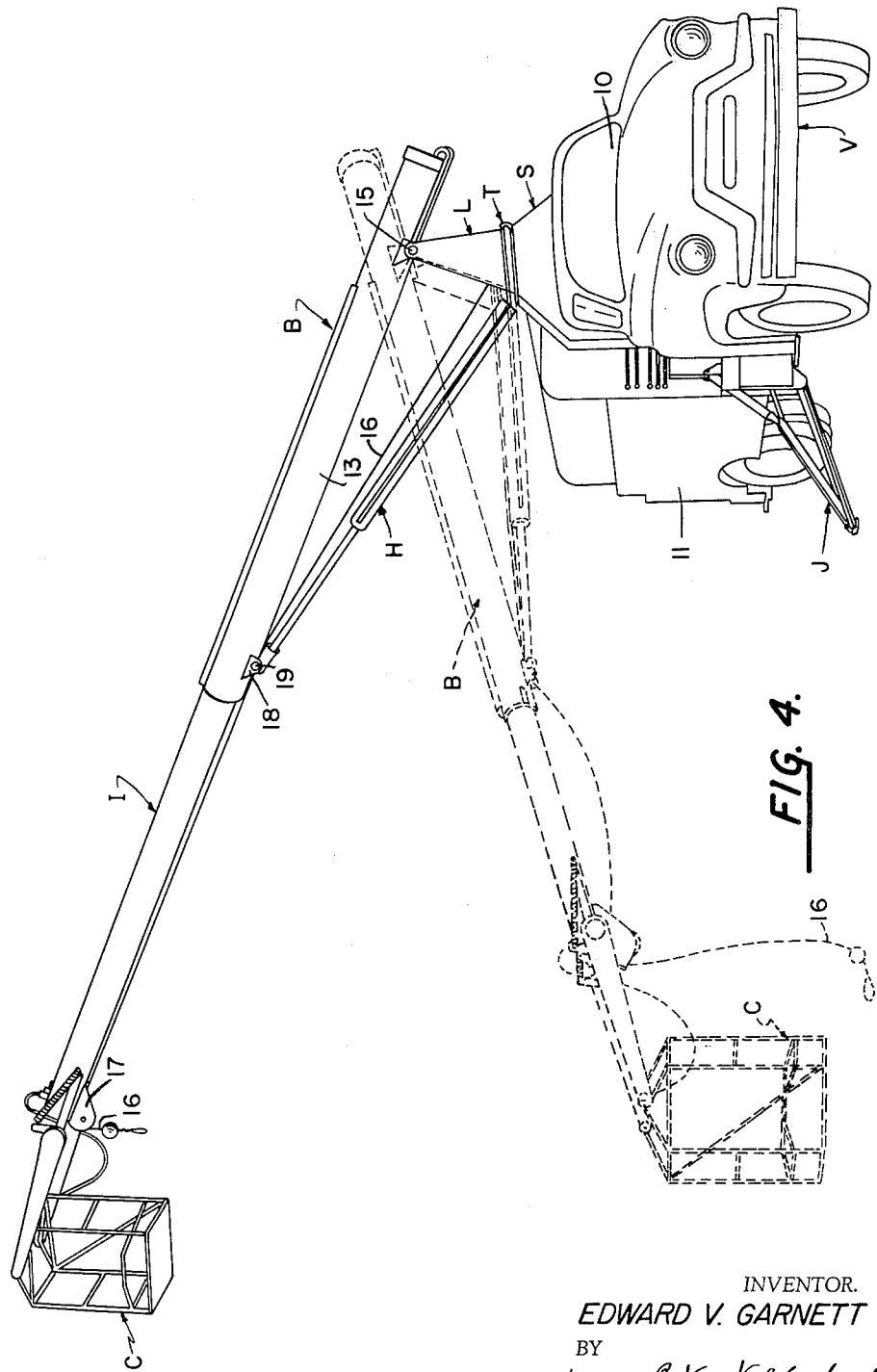

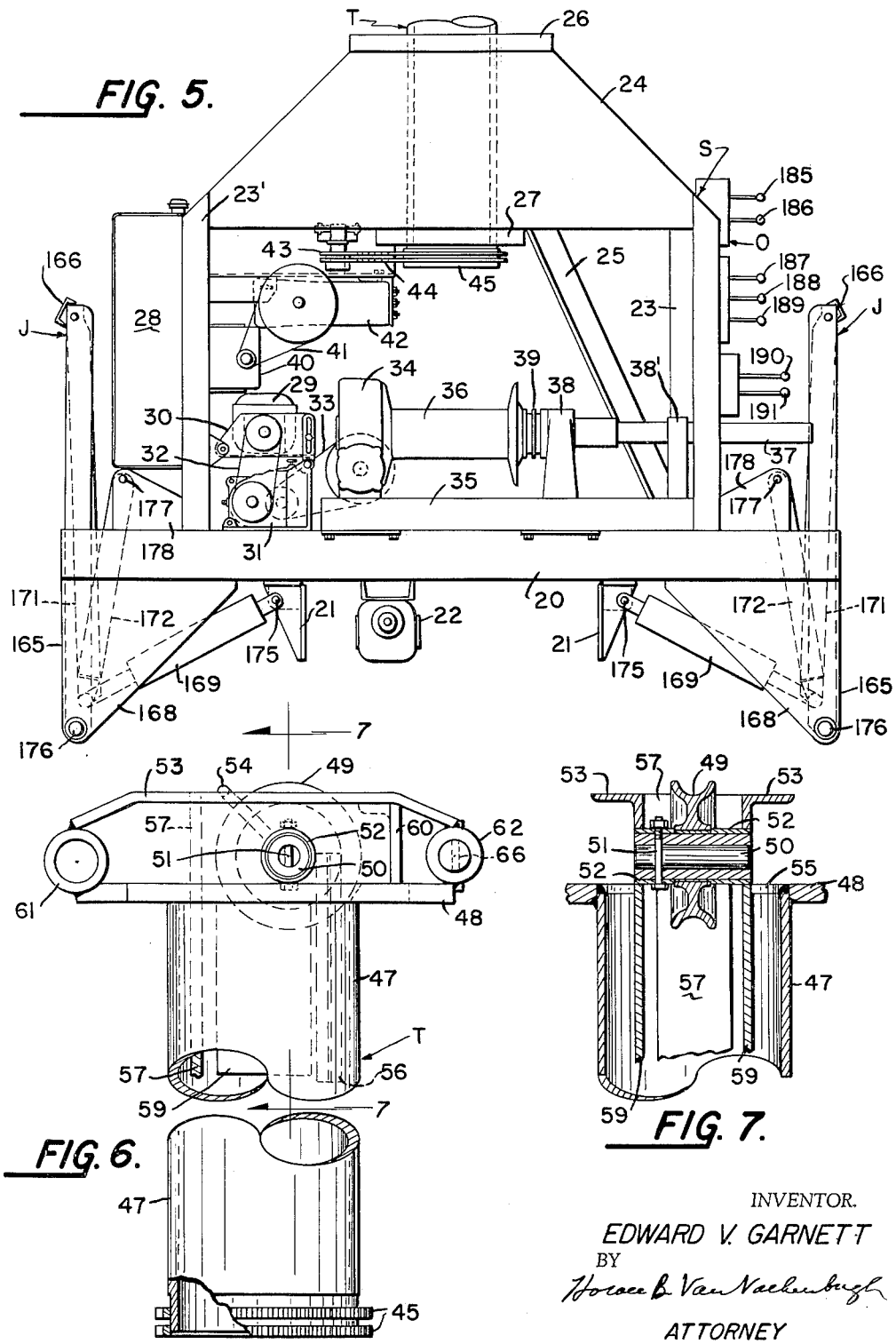

Oct. 2, 1962 E. V. GARNETT 3,056,510
DERRICK FOR VEHICLES

Filed April 28, 1958 14 Sheets-Sheet 6

INVENTOR.
EDWARD V. GARNETT
BY
ATTORNEY

Oct. 2, 1962     E. V. GARNETT     3,056,510
DERRICK FOR VEHICLES

Filed April 28, 1958     14 Sheets-Sheet 7

INVENTOR.
EDWARD V. GARNETT
BY
Horace B. Van Valkenburgh
ATTORNEY

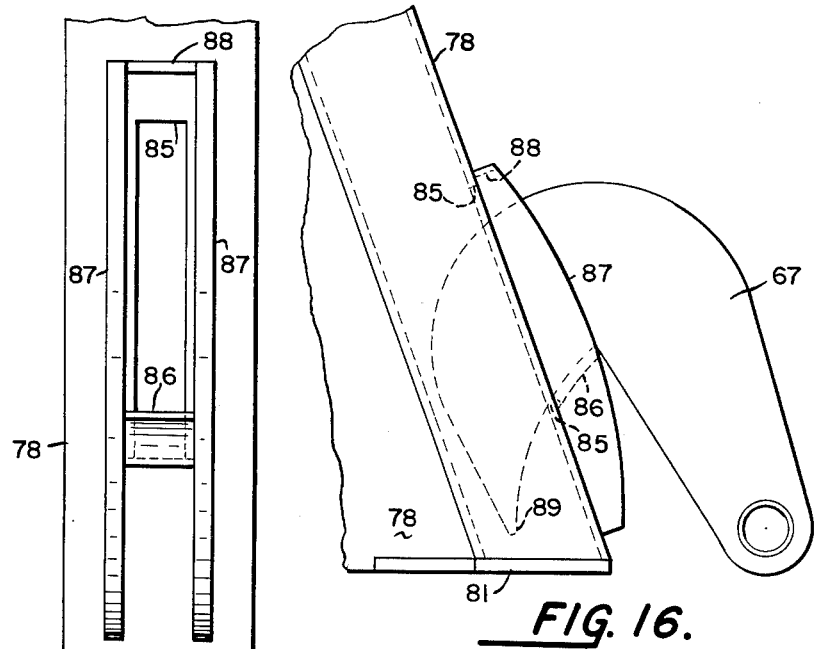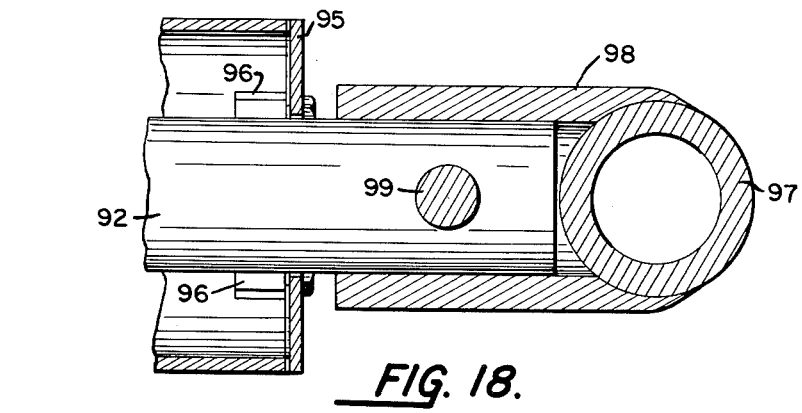

Oct. 2, 1962  E. V. GARNETT  3,056,510
DERRICK FOR VEHICLES
Filed April 28, 1958  14 Sheets-Sheet 9
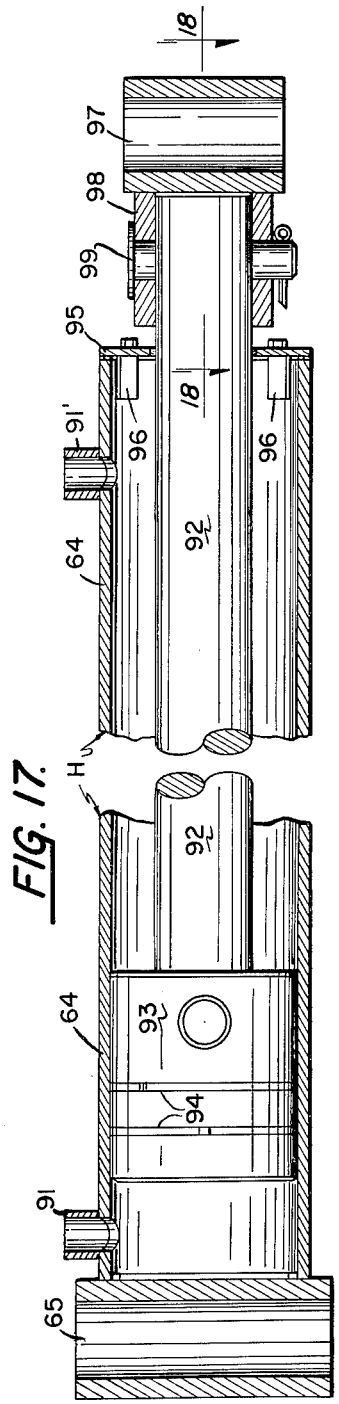
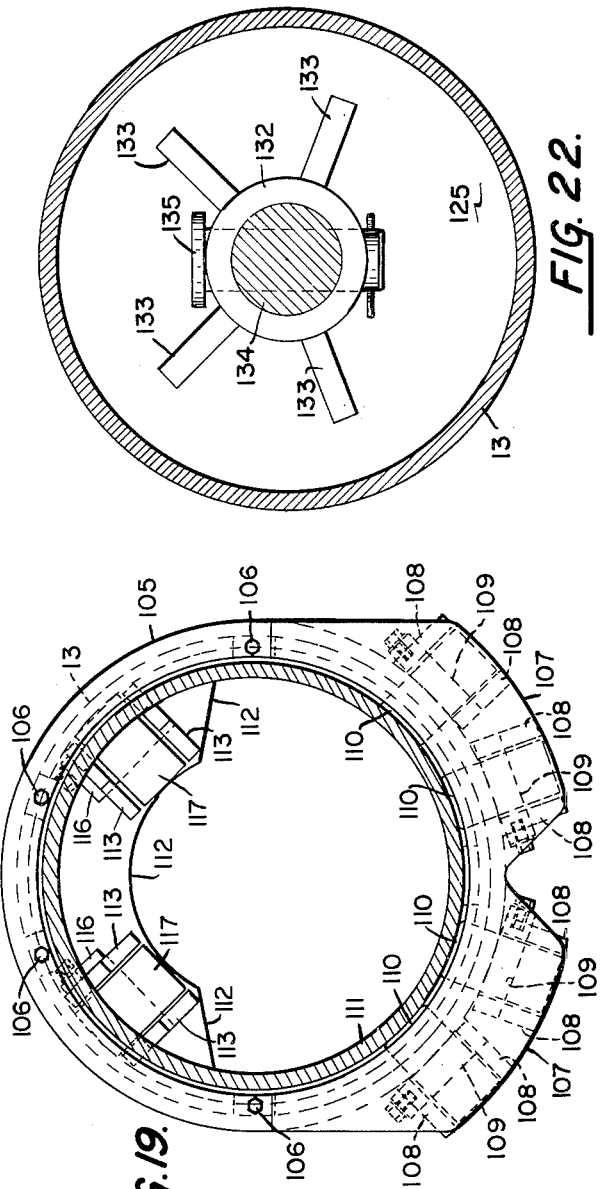
INVENTOR.
EDWARD V. GARNETT
BY
Horace B. Van Valkenburgh
ATTORNEY

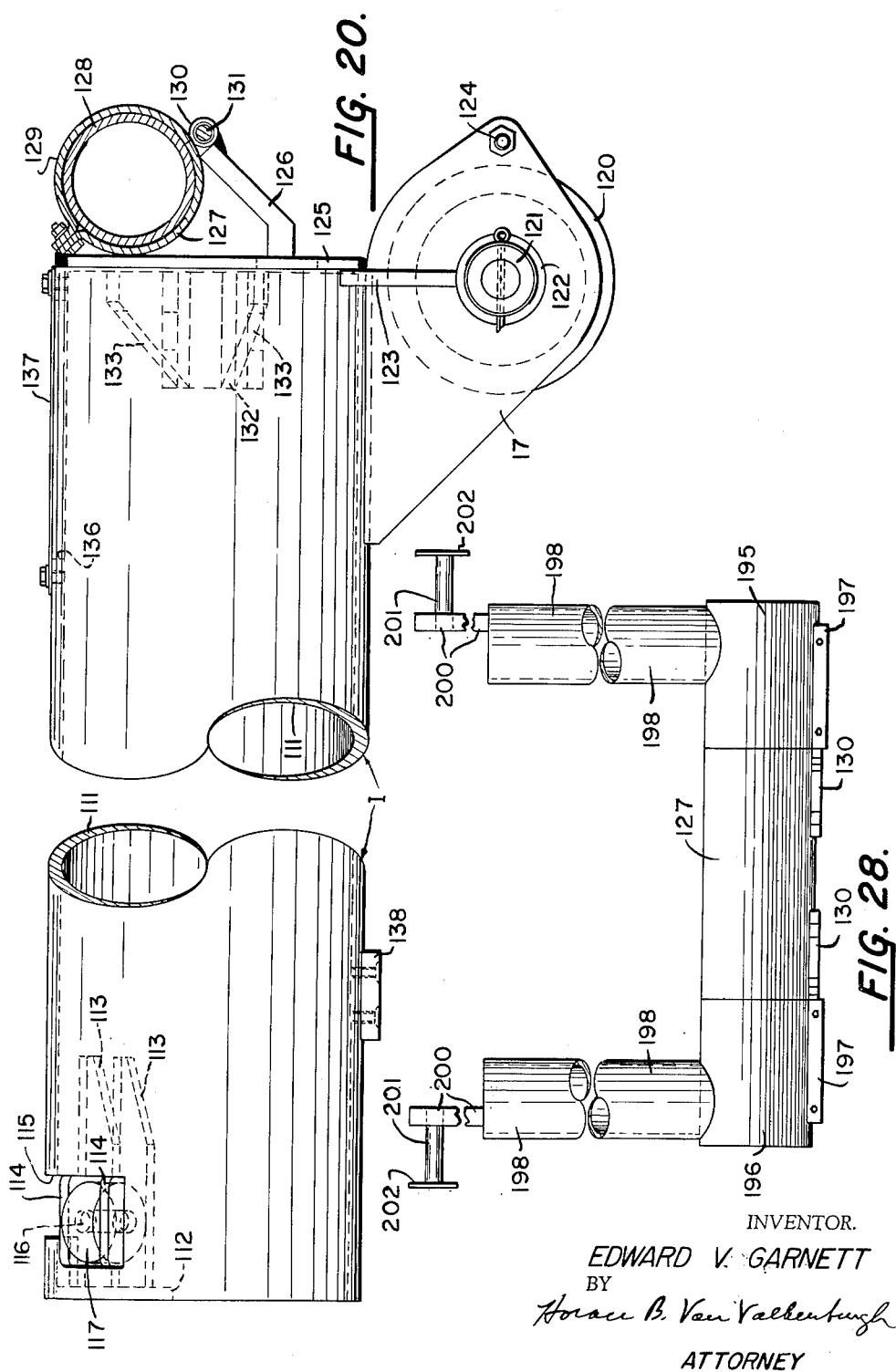

Oct. 2, 1962 E. V. GARNETT 3,056,510
DERRICK FOR VEHICLES
Filed April 28, 1958 14 Sheets-Sheet 11
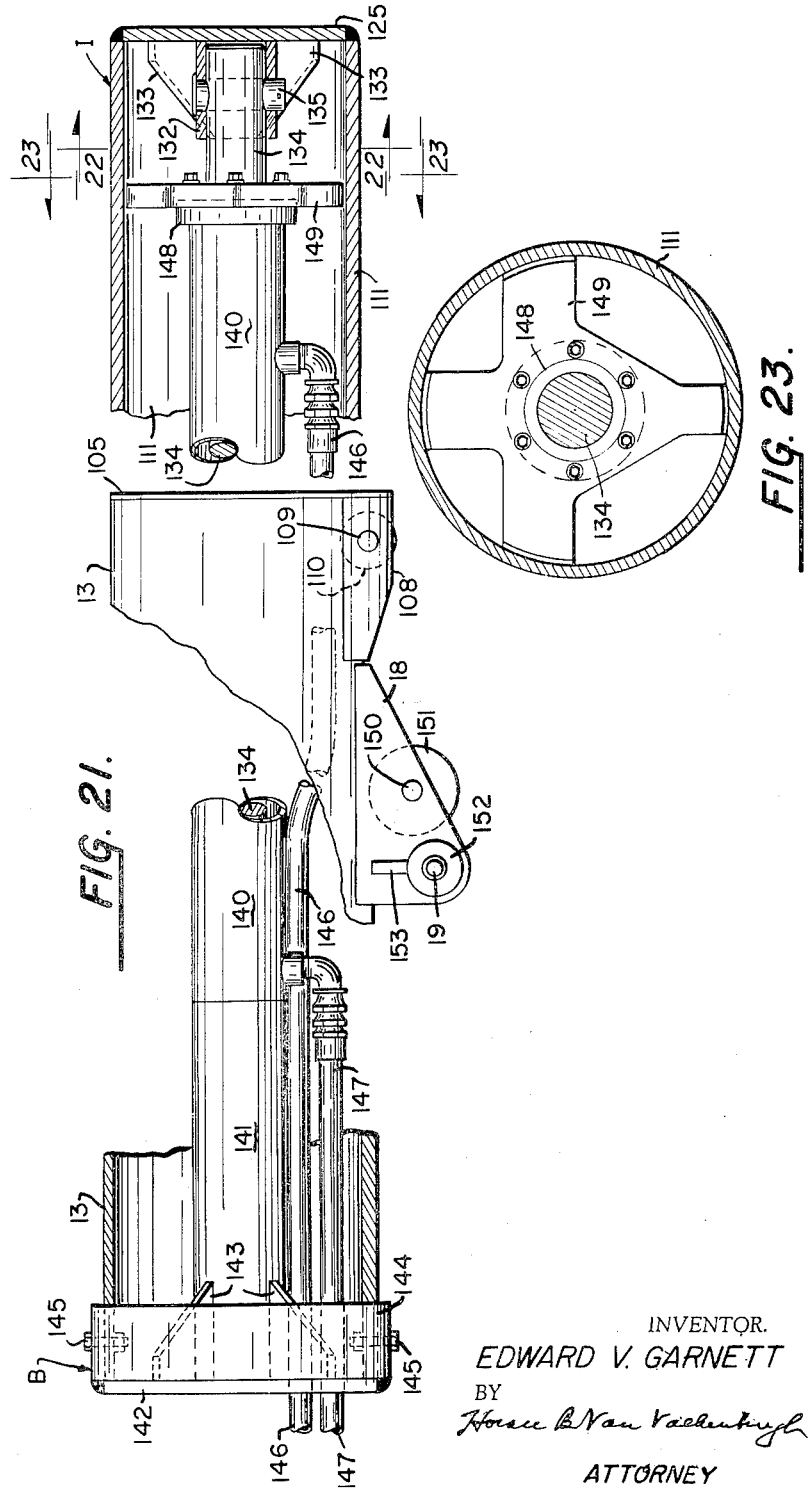
INVENTOR.
EDWARD V. GARNETT
BY
ATTORNEY INVENTOR.
EDWARD V. GARNETT
BY
*Horace B. Van Valkenburgh*
ATTORNEY Oct. 2, 1962 E. V. GARNETT 3,056,510
DERRICK FOR VEHICLES
Filed April 28, 1958 14 Sheets-Sheet 13
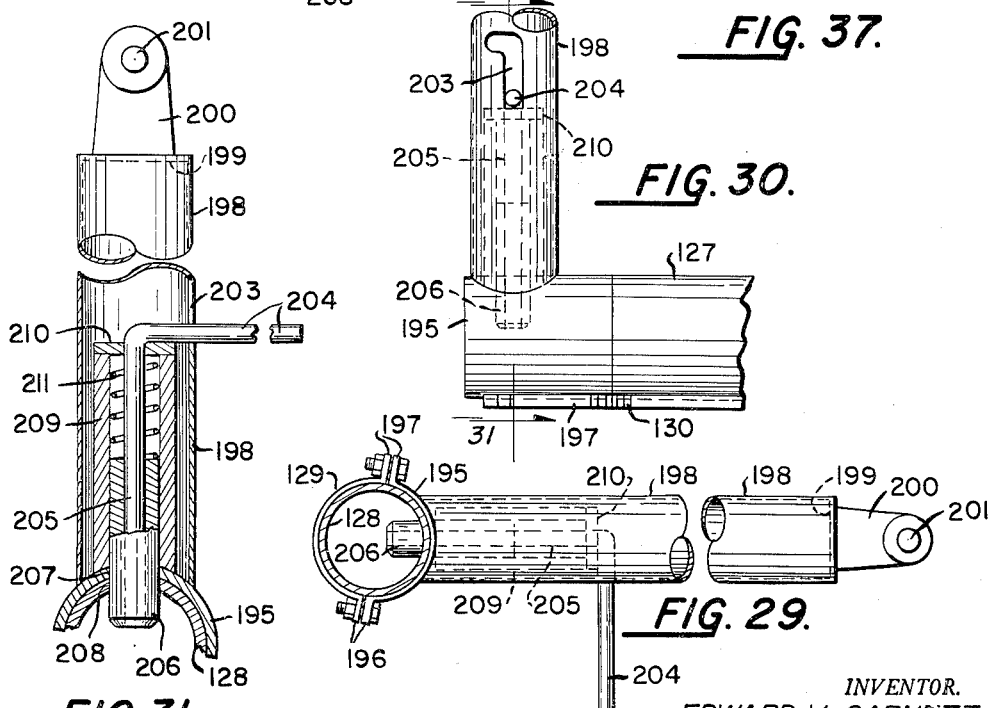
INVENTOR.
EDWARD V. GARNETT
BY
Horace B. Van Valkenburgh
ATTORNEY Oct. 2, 1962 E. V. GARNETT 3,056,510
DERRICK FOR VEHICLES
Filed April 28, 1958 14 Sheets-Sheet 14
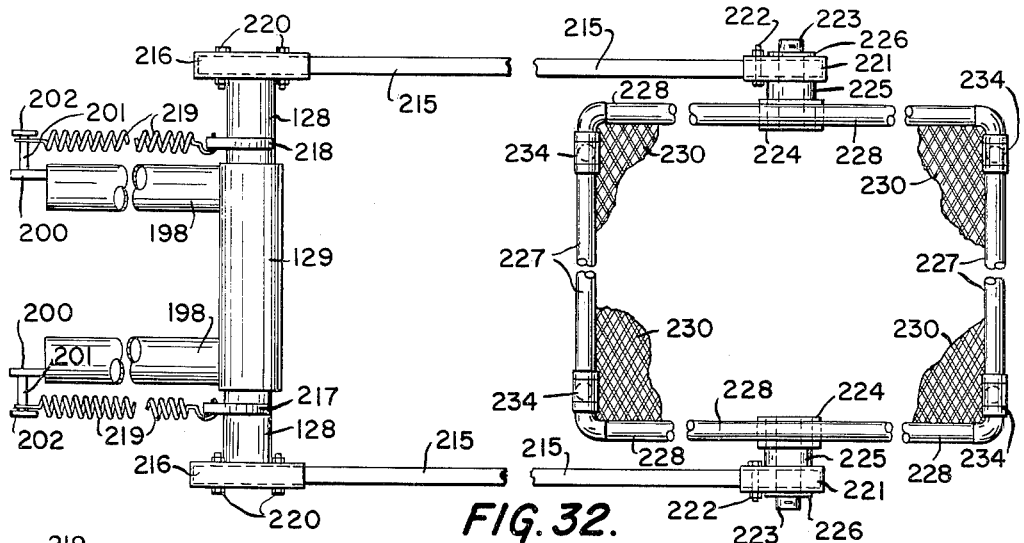
FIG. 32.
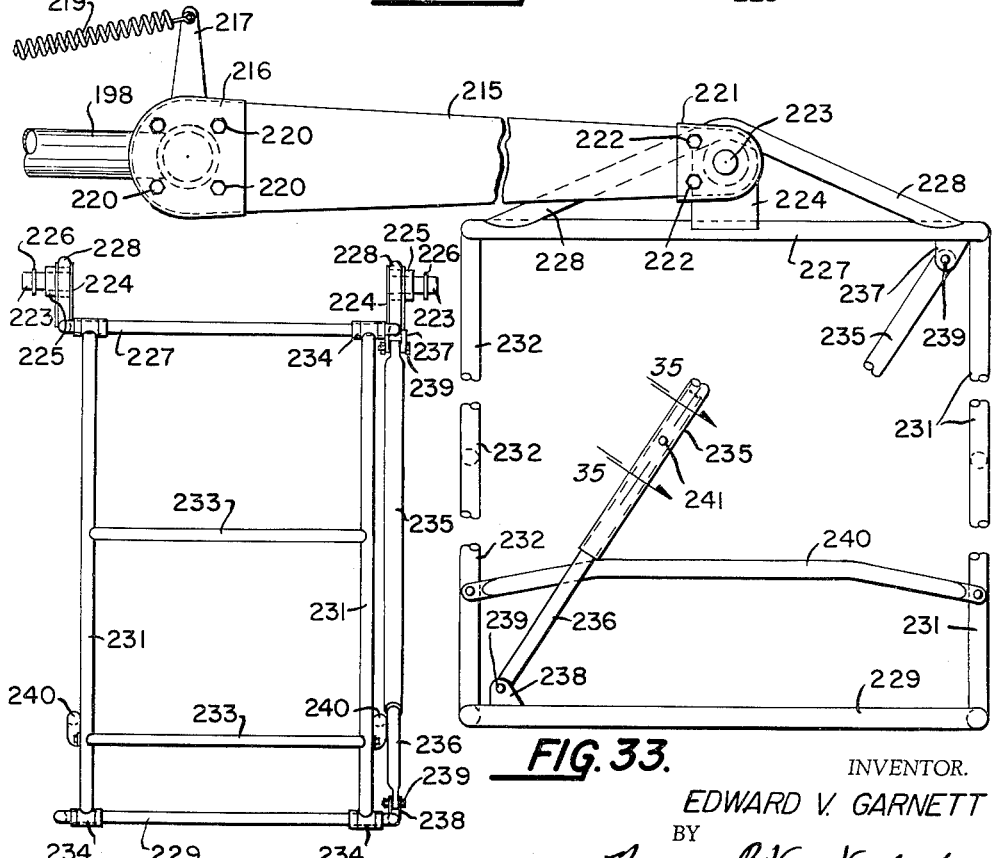
FIG. 33.
FIG. 34.
INVENTOR.
EDWARD V. GARNETT
BY
Horace B. Van Valkenburgh
ATTORNEY United States Patent Office 3,056,510
Patented Oct. 2, 1962

3,056,510
DERRICK FOR VEHICLES
Edward V. Garnett, 3963 Walnut St., Denver, Colo.
Filed Apr. 28, 1958, Ser. No. 731,485
14 Claims. (Cl. 212—59)

This invention relates to derricks, and more particularly to a derrick which is especially adapted to be mounted upon a vehicle, such as a truck, to provide a portable unit. The derrick of this invention is particularly adapted to be mounted upon a panel type truck.

The derrick of the Edward V. Garnett and George M. Gromer U.S. Patent No. 2,715,014, granted August 9, 1955, and also the derrick of my copending application Serial No. 537,764, filed September 30, 1955, now U.S. Patent No. 2,907,473, granted October 6, 1959, are each highly satisfactory in operation, but are limited in movement, i.e., they can be swung in an arc over the body of the truck and rearwardly of the truck, or forwardly of the truck if mounted on the forward end thereof, but not around to either side. Also, such derricks are limited in the amount which the boom thereof can be extended. It is desirable to provide a derrick which can be moved through a full 360°, so that loads may be handled not only rearwardly, but also at any point at the sides of the truck and also forwardly thereof. In addition, it is desirable to provide a derrick having a boom which can be extended to provide a length considerably greater than the truck on which it is mounted. However, an important problem involved, particularly in the latter desideratum, is the storage of the derrick atop the vehicle. It is also desirable to enable linemen, electricians and the like, to work at an elevated position, as by mounting a workman's cage or platform on the derrick, but such a platform or cage involves storage problems and also should be so constructed that it will not interfere with the use of the derrick as a hoisting device.

Among the objects of the present invention are to provide a novel derrick, particularly a derrick for vehicles; to provide such a derrick which can be raised and lowered to substantially any desired angle and which also can be rotated through a full 360°; to provide such a derrick which will occupy a minimum of otherwise useful space; to provide such a derrick which can be securely mounted on the truck; to provide such a derrick which can be readily placed in a storage position atop the vehicle or truck, without extending an undue distance above the truck or forwardly or rearwardly thereof; to provide such a derrick which can be utilized in hoisting loads, moving and setting telephone poles and the like and for other uses; to provide such a derrick which is particularly adapted to provide with a workman's cage or platform; to provide a workman's cage or platform structure which is particularly adapted to be mounted on the derrick of this invention, but which may be used in connection with other types of derricks; to provide such a workman's cage or platform which may be readily attached to and detached from the derrick; to provide such a workman's cage or platform which may be folded into a storage position and will lie atop the vehicle, with the derrick, without unduly increasing the amount of space occupied by the derrick; to provide such a derrick which is readily controlled, as from the truck on which it is mounted, or by additional controls which may be extended to a workman's platform or cage, when the latter is used; and to provide such a derrick which is readily constructed and will be effective and efficient in operation.

Additional objects and the novel features of this invention will become apparent from the description which follows, taken in connection with the accompanying drawings, in which:

FIG. 4 is a perspective view, taken from a point forwardly of and to one side of the truck, showing the boom extended and the derrick in lower and intermediate positions at one side of the truck, with the workman's cage or basket also in position for use;

FIG. 5 is a rear elevation of a superstructure which may be mounted on the truck, as between the cab and the body and which contains a number of operating parts;

FIG. 6 is a condensed side elevation of a turntable which is supported by the superstructure of FIG. 5 and which in turn supports the derrick boom and associated parts;

FIG. 7 is a fragmentary, vertical section taken along line 7—7 of FIG. 6;

FIG. 15 is a fragmentary, oblique view on an enlarged scale, of a locking portion of the pivot bracket, taken from the position of line 15—15 of FIG. 13;

FIG. 16 is a fragmentary side elevation, illustrating the manner in which a locking hook engages the locking portion of the pivot bracket shown in FIG. 15;

FIG. 17 is a condensed longitudinal section of a hydraulic cylinder assembly or hydraulic leg which positions the boom;

FIG. 18 is a fragmentary, transverse longitudinal section, on an enlarged scale, taken along line 18—18 of FIG. 17 at the outer end of the hydraulic leg;

FIG. 19 is an enlarged cross section of the boom, taken at the position of line 19—19 of FIG. 2, with certain parts omitted for clarity of illustration;

FIG. 20 is a condensed side elevation of an inner boom assembly;

FIG. 21 is a condensed side elevation of the boom, partly in longitudinal section and with certain parts omitted for clarity of illustration;

FIG. 22 is an enlarged cross section taken along line 22—22 of FIG. 21;

FIG. 23 is an enlarged cross section taken along line 23—23 of FIG. 21;

FIG. 28 is a condensed top plan view of a yoke adapted to cooperate with a workman's cage or basket;

FIG. 29 is a condensed side elevation, on a slightly enlarged scale, of the yoke of FIG. 28;

FIG. 30 is a fragmentary, bottom plan view of a portion of the yoke of FIGS. 28 and 29;

FIG. 31 is an enlarged condensed section, taken along line 31—31 of FIG. 30;

FIG. 32 is a condensed top plan view of the workman's cage or basket, when in position for use as shown in FIG. 4;

FIG. 33 is a condensed side elevation of the workman's basket of FIG. 32;

FIG. 34 is a front elevation, on a reduced scale, of the workman's basket of FIG. 32, with the supporting arms omitted for clarity of illustration;

FIG. 35 is an enlarged fragmentary section, taken along line 35—35 of FIG. 33, showing a locking bolt which may be used to hold the basket in assembled position;

FIG. 36 is a fragmentary section showing an alternative locking bolt;

FIG. 37 is a side elevation, with certain associated parts shown in section, of an alternative, braking pivot for the workman's basket of FIG. 32; and FIG. 38 is a side elevation of a tensioning nut which may be used in conjunction with the pivot of FIG. 37.

Figure 1:
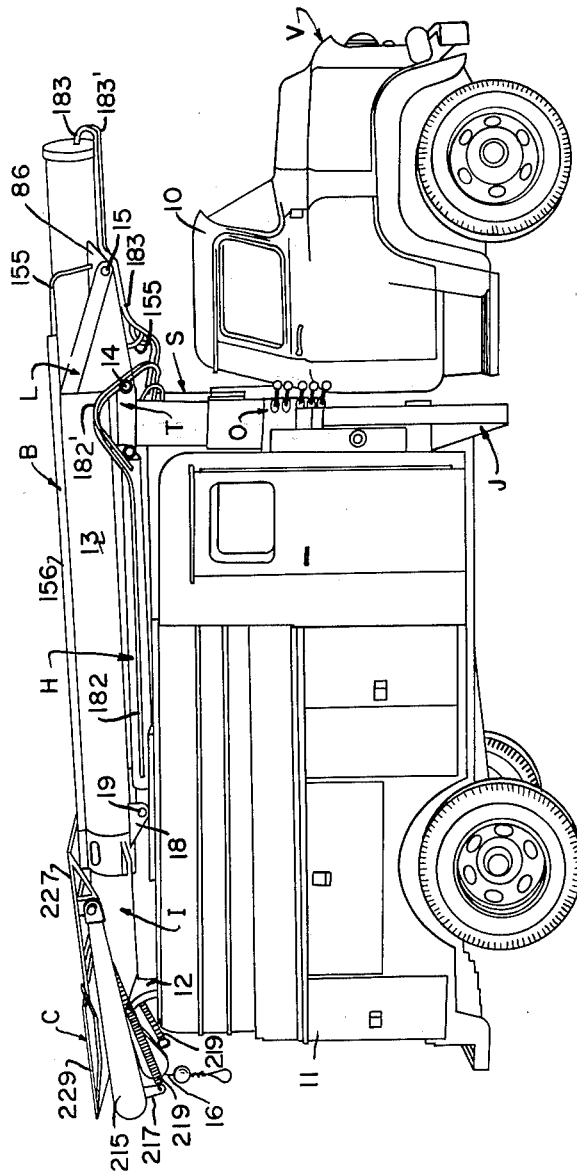
FIG. 1 is a side elevation of a panel type truck on which is mounted a derrick constructed in accordance with this invention, the derrick being shown in folded or storage position and also provided with a workman's cage or platform, the latter also being shown in folded or storage position.
Figure 2:
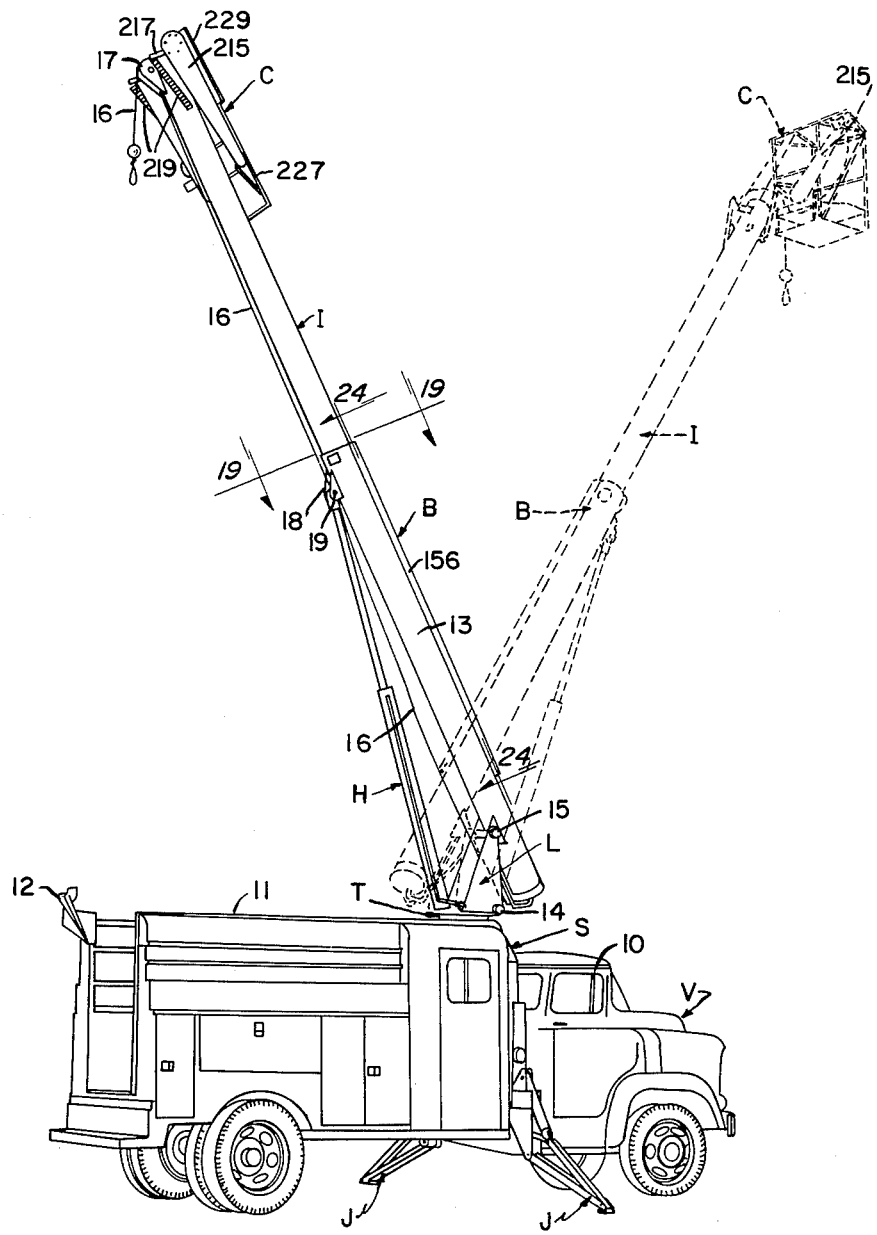
FIG. 2 is a perspective view, taken from a point rearwardly of and to one side of the truck, showing the derrick with its boom in two extended, upper positions, with the workman's cage or platform folded in the full position and open in the dotted position.

As illustrated in FIG. 1, a derrick constructed in accordance with this invention may be mounted on a vehicle V, such as a panel type truck, as shown, having a cab 10 and a panel body 11. The derrick may include a boom B, shown in storage position atop the vehicle, which may rest at one end on a supporting bracket 12, mounted on the rear end of the panel body 11. Adjacent its opposite end, the boom is pivotally attached to a bracket lever L, which in turn is pivotally mounted on a turntable T, which is supported by a superstructure S. The superstructure S preferably has a minimum depth, so as to occupy the least amount of space possible between cab 10 and the panel body 11, but houses a number of parts, such as an oil reservoir, a pump, a major portion of the turntable T and bearing blocks thereof, as will be described later. At each side, the superstructure S may be provided with a jack leg J, adapted to be extended downwardly and outwardly at each side, as in FIGS. 2 and 4, so as to provide lateral support for the vehicle, particularly in the event that the load is being handled at one side or the other thereof. The jack legs J or outriggers are disclosed and claimed in my copending divisional application Serial No. 133,117, filed August 22, 1961, entitled "Outriggers for Vehicles." The outer end of the boom B may, if desired, be provided with a workman's cage or platform C, shown in folded position in FIG. 1 and in unfolded or use position in FIG. 4, the cage or platform C being detachable and the boom also being capable of being utilized for hoisting purposes with the cage C in folded position, as shown in full in FIG. 2. The workman's cage or platform C is disclosed and claimed in my copending application Serial No. 133,116, filed August 22, 1961, entitled "Workman's Cage or Aerial Basket," which is in part a division and in part a continuation of the present application. The boom B may comprise an outer cylinder 13 and an inner boom assembly I, which, as in FIG. 2, is adapted to be extended in a manner described later. The boom may be connected with the turntable T by a hydraulic cylinder assembly or hydraulic leg H, so that the boom may be raised and lowered to any desired angular position, such as the positions shown in FIGS. 2, 3 and 4. As will be evident, with the boom B in the storage position of FIG. 1, when the hydraulic leg H is extended, the bracket lever L will pivot on a pin 14 from the down position of FIG. 1 to the up or full position of FIG. 3, so as to place the pivot axis of the boom B, as at a pin 15, more directly above the turntable T. The bracket lever L is locked in the full position of FIG. 3, for use of the derrick, in a manner described later. As will be evident from FIG. 3, the boom B may be moved from the full position to any of the dot-dash positions, including any intermediate position. In addition, the inner boom assembly I may be extended to the position shown in FIG. 3, or to any intermediate position between the retracted and fully extended positions. As in FIGS. 2 and 4, the boom may be provided with a hoisting cable 16, adapted to engage a sheave mounted in a bracket 17 at the outer end of the inner boom assembly I, as well as a sheave mounted in a bracket 18 at which the hydraulic leg H is pivotally attached to the boom, by a pin 19, and thence to the center of the turntable T, the cable 16 passing between the two sides of the bracket lever L and thence to a winch mounted in the superstructure S, in a manner described later.

As illustrated in FIG. 5, the superstructure S may include a base 20 which extends transversely of and rests upon the frame of the vehicle V, being adapted to be attached to the frame by mounting brackets 21. The jack legs J, described in greater detail later, are conveniently mounted on the opposite ends of the base 20, while a hydraulic pump 22 may be mounted on the underside of the base 20, and driven from the motor of the vehicle V in any suitable manner, preferably including a clutch or a similar device so that the hydraulic pump 22 may be optionally connected and disconnected. The superstructure S may also include a pair of laterally spaced, upright stanchions 23 and 23', the upper ends of which support a conveniently trapezoidal shaped box 24, preferably formed of angles or channels and plate, welded together to form a hollow, unitary structure, conveniently reinforced by an angular brace 25. An upper bearing block 26 may be mounted atop box 24, in a central position, while a lower bearing block 27 may be mounted directly beneath the upper bearing block, conveniently on the underside of box 24. The upper and lower bearing blocks are engaged by the turntable T, while the upper bearing block also supports the turntable T for rotation. A control assembly O, provided with control levers as identified later, may be mounted on the outer side of the stanchion 23, while a tank 28, adapted to serve as a reservoir for the hydraulic fluid, may be mounted on base 20 outside the opposite stanchion 23'. A hydraulic motor 29, which may be supplied with hydraulic fluid from pump 22 and may be mounted on a vertically adjustable platform 30 above a speed reducer 31, is adapted to drive a pulley or sprocket connected by a belt or chain 32 with an input pulley or sprocket of speed reducer 31. The speed reducer 31 is adapted to drive, through a belt or chain 33 and appropriate pulleys or sprockets, a worm and gear reduction unit 34, the latter being mounted on a winch base 35, in turn mounted on superstructure base 20. The worm and gear reduction unit 34 is adapted not only to turn a reel 36 for the hoist cable 16, but also to selectively drive an extension shaft 37, on the outer end of which a takeup reel for a pulling cable or the like may be mounted. A bearing standard 38 for the reel 36 and a bearing standard 38' for the extension shaft 37 may also be mounted on the winch base 35, while a suitable mechanism 39 for holding the winch in any desired position may be associated with reel 36, the mechanism 39 being of a conventional nature and the details thereof therefore not being shown. For driving the turntable T, a portion of which is shown in FIG. 5, a hydraulic motor 40, such as also supplied with fluid from pump 22, may be mounted on stanchion 23' and may drive, through a chain 41 and suitable sprockets therefor, a speed reduction unit 42. Speed reduction unit 42 may drive sprockets 43, which in turn are connected by a pair of chains 44 with sprockets 45 of turntable T. The otherwise unenclosed space within the superstructure may also be closed by suitable panels, at both front and rear.

Figure 8:
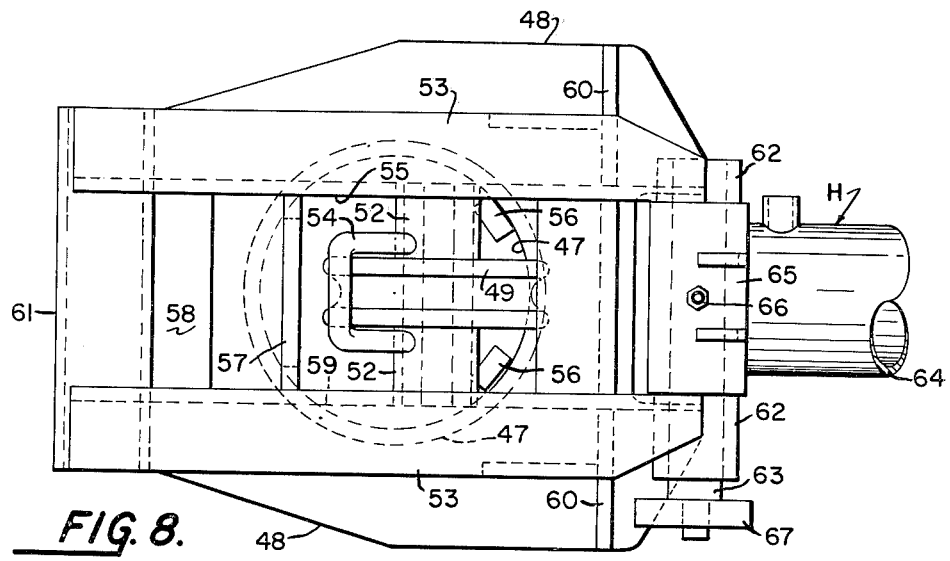
FIG. 8 is a top plan view of the turntable of FIG. 6, showing also a portion of the boom and certain associated parts mounted thereon.

As illustrated in FIGS. 6, 7 and 8, the turntable T may include a cylinder 47 depending from a bearing plate 48, the sprockets 45 being mounted on the lower end of cylinder 47 and the hoist cable 16 extending from the winch reel 36 of FIG. 5 through the cylinder to engage a sheave 49 rotatably mounted on a tubular shaft 50 which may be anchored by a bolt 51 and received in collars 52 attached, as by welding, in suitable holes in the vertical legs of angles 53, which may also be attached, as by welding, to the top of plate 48. A U-shaped guide 54, shown also in FIG. 8, may be attached at its opposite ends to the respective collars 52, to maintain cable 16 in engagement with sheave 49. As will be evident from FIGS. 7 and 8, plate 48 may be provided with a generally rectangular aperture 55, arcuate at two adjacent corners. As in FIGS. 6 and 8, cylinder 47 and collars 52 may be reinforced by a pair of bars 56, extending vertically in the cylinder and attached thereto, as by welding, and also attached at the upper end to the respective adjacent collar 52. Reinforcement between cylinder 47, plate 48 and angles 53 may be provided by a gusset 57 having a wider upper end extending between the vertical legs of angles 53 and also downwardly within cylinder 47, and further reinforcement by a lateral bar 58, a pair of gussets 59 extending from the underside of plate 48 and downwardly within cylinder 47 and a lateral rib 60 extending between each angle 53 and plate 48. The gusset 57, bar 58, gussets 59 and ribs 60 are conveniently attached in any suitable manner, as by welding.

A bearing tube 61, adapted to receive the pin 14 of FIGS. 1 and 2, about which the bracket lever L pivots, may be attached, as by welding, to the plate 48 and also to angles 53, as in FIGS. 6 and 8. At the opposite end of plate 48, a bearing collar 62 may be attached, as by welding, to each angle 53 and plate 48, the bearing collars 62 being adapted to receive a pin 63 on which the hydraulic leg H pivots. Thus, the hydraulic leg H may include a cylinder 64 provided at its lower end with a transverse tubular sleeve 65 which surrounds pin 63 and is locked thereto, as by a bolt 66, it being noted that bolt 66 is shown in dotted lines in FIG. 6 merely to illustrate the position thereof, it being understood that bolt 66 is not connected to either collar 62. A hook 67, adapted to lock the bracket lever L in upright position, in a manner described later, may be keyed to the reduced outer end of pin 63, so that when hydraulic leg H is elevated to the full position of FIG. 3, hook 67 will engage the bracket lever L, as described later in connection with FIG. 16.

Figure 11:
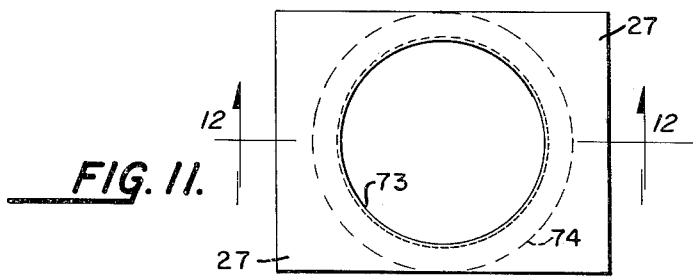
FIG. 11 is a top plan view of a lower bearing block, mounted in the superstructure of FIG. 5.
Figure 12:
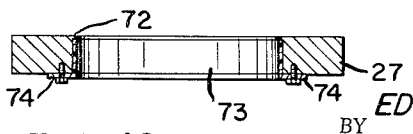
FIG. 12 is a cross-section of the lower bearing block, taken along line 12—12 of FIG. 11.
Figure 9:
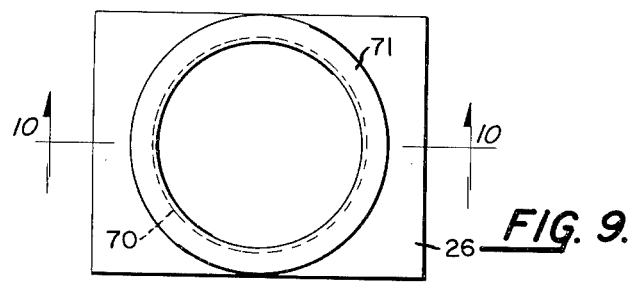
FIG. 9 is a top plan view of an upper bearing block, mounted on the superstructure of FIG. 5.
Figure 10:
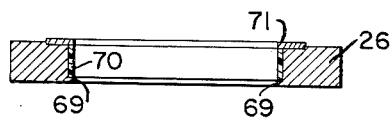
FIG. 10 is a cross section of the upper bearing block, taken along line 10—10 of FIG. 9.

The upper bearing block 26, as in FIGS. 9 and 10, may be a rectangular plate having a central circular aperture provided with a ledge 69 at its lower edge on which rests an annular bearing bushing 70, held in position by a flat, circular bearing ring 71, which may be attached to block 26 in a suitable manner, as by countersunk machine screws. Bushing 70 and ring 71 are conveniently formed of a suitable bearing material, such as "Polypenco Nylon." As will be evident, bushing 70 receives the side thrust of cylinder 47 of turntable T at the upper end thereof, while flat ring 71 receives the downward thrust of bearing plate 48 of turntable T. A slight recess for flat ring 71 may be provided in the top of block 26, as shown, it being necessary for flat ring 71 to extend for only a short distance above the upper surface of block 26, while ledge 69 preferably has an inner diameter a few thousandths of an inch greater than the inner diameter of bushing 70. The lower bearing block 27, as in FIGS. 11 and 12, may be generally rectangular and provided with a central, circular aperture having at its upper edge a ledge 72 having a slightly greater inner diameter than an annular bushing 73 which abuts it. Bushing 73 is formed of suitable bearing material, such as "Polypenco Nylon" and may be secured in position by a washer 74 attached to the underside of block 27 in a suitable manner, as by cap screws as shown. Preferably, washer 74 also has an inner diameter slightly greater than the inner diameter of bushing 73.

Figure 13:
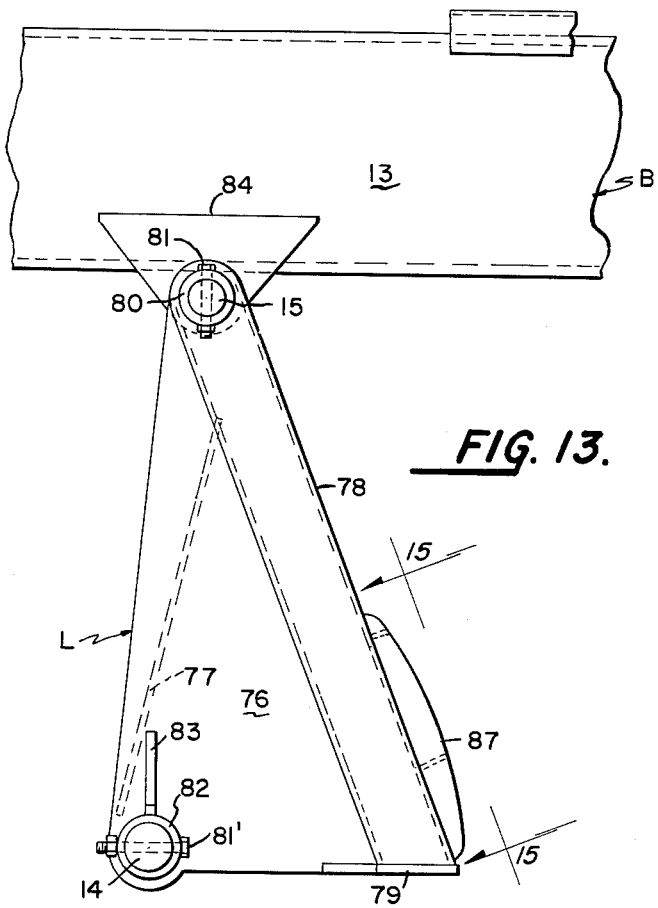
FIG. 13 is a side elevation, on an enlarged scale, of a pivot bracket or lever for the boom, which is mounted atop the turntable of FIG. 6, showing also a portion of the boom.
Figure 14:
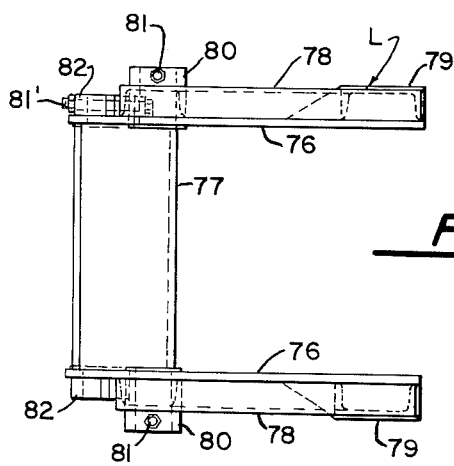
FIG. 14 is a bottom plan view of the pivot bracket of FIG. 13.

As illustrated in FIGS. 13 and 14, the bracket lever L may comprise a pair of side plates 76, generally triangular in shape and connected together by an angularly disposed web plate 77, as well as being reinforced by an inwardly facing channel 78 on the outside of the hypotenuse edge. A pad 79 may be disposed at the lower end of each channel 78 to provide a greater bearing area for engagement with the top of bearing plate 48 of turntable T of FIG. 8, alongside the angles 53 adjacent the ribs 60, when the bracket lever is moved to upright or use position. The upper ends of the flanges of each channel 78 may be bent around and welded together to extend around a collar 80 which receives the pin 15 about which the boom B pivots, while each collar 80 may extend through the side plate 76 and the web of the corresponding channel 78, extending outwardly from the latter, and may be attached thereto in a suitable manner, as by welding. Also, the other parts of the bracket lever, mentioned previously, may be attached together in a suitable manner, as by welding, while pin 15 may be locked to one of the collars 80, as by a bolt 81. At the lower corner opposite each channel 78, a collar 82 may be attached, as by welding, to the respective side plate 76 and may be reinforced by a gusset 83, the collars 82 being adapted to receive the pin 14 on which bracket lever L pivots, which pin may be locked to one of the collars 82, as by a bolt 81'. The boom B may be connected to the pivot pin 15 by a tubular sleeve attached, as by welding, between a pair of spaced brackets 84, disposed just inside the side plates 76 of the bracket lever L and attached, as by welding, to the outer cylinder 13 of the boom.

As in FIGS. 13, 15 and 16, one of the channels 78 may be provided with a slot 85 at the lower end of which an arcuate, hook engaging plate 86 extends outwardly between a pair of reinforcing plates 87 which not only support the hook plate 86, but also reinforce the slot 85. The upper ends of reinforcing plates 87 may, in turn, be reinforced by a gusset 88, while the various parts may be attached together in a suitable manner, as by welding. As will be evident, the hook 67, as in FIG. 16, will engage the plate 86 whenever the hook pivots from the position of FIG. 8 enough for the hook point 89 to reach the outer edge of plate 86, while during further pivotal movement of the hook, its point 89 merely moves further along plate 86 and into slot 85.

When the hydraulic leg H is first extended, with the boom B in the storage position of FIG. 1, the bracket lever L will be forced to pivot upwardly and as soon as the bracket lever has reached an upright position, the position of the bracket lever shown in full in FIG. 2, the boom will start to rise and the hydraulic leg H will itself start to move upwardly. As soon as the hydraulic leg has moved through an appropriate angle, such as to the full position of FIG. 3, the hook 67 will have moved from its normal rest position of approximately vertical through, say, 35° to 40°, at which time the hook point 89 will have reached the upper edge of hook plate 86 of FIG. 16, at which time the boom is slightly above horizontal, such as about 20° thereto, and from this position until the maximum upright position, such as 75° to the horizontal, is obtained, hook point 89 will remain engaged with hook plate 86. Thus, in all positions from about the full position of the boom of FIG. 3, upwardly to its maximum upper position, hook point 89 will remain engaged with hook plate 86, so that bracket lever L is locked against any reverse movement, thus preventing the bracket lever L from collapsing in the event that the direction of the load on the boom changes suddenly. It will be noted that in the full position of FIG. 3 and below, the load on the end of the boom from the hoisting cable is a sufficient distance from the connection of the boom to bracket lever L, so that normal and even unusual load conditions will not cause the bracket lever L to pivot back to the down or storage position.

Figure 3:
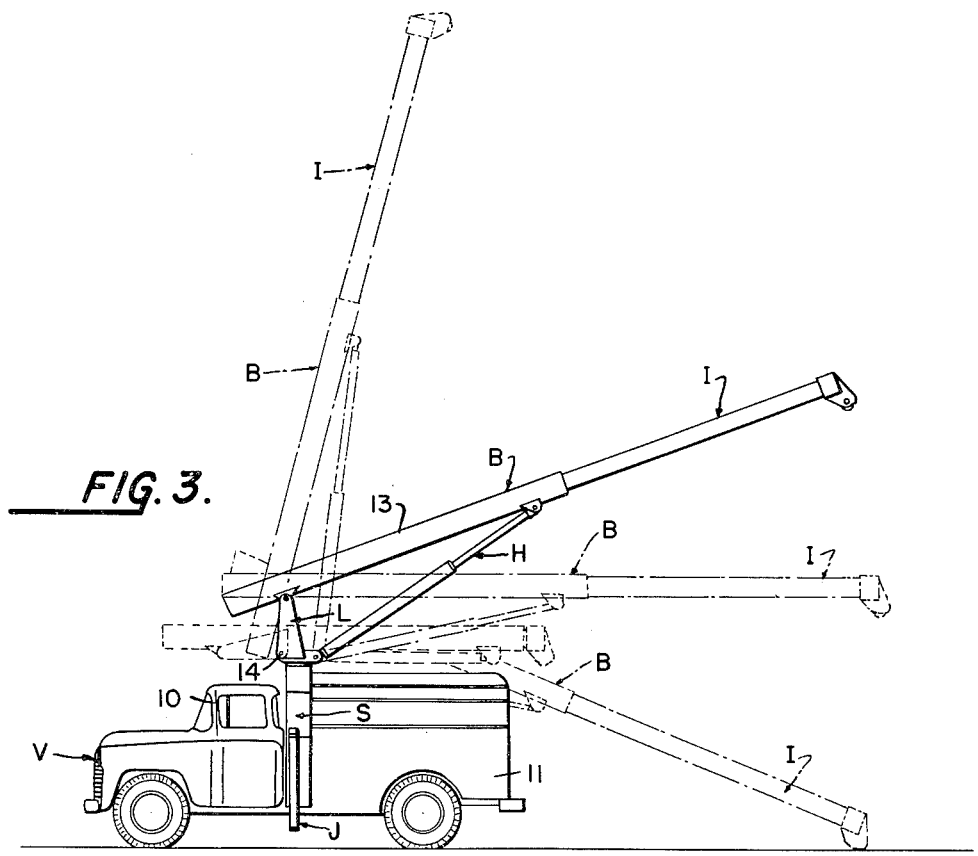
FIG. 3 is a side elevation, on a reduced scale, of the truck and derrick of FIG. 1, showing also the derrick boom in various angular positions.

When the boom is to be moved from the use position of FIG. 3 to the storage position of FIG. 1, the bracket lever L will remain locked in upright position, until the boom B reaches the full position of FIG. 3, at which time the hook point 89 will clear the hook plate 86, but the bracket lever will remain upright and the boom will continue to lower until the lowest position shown in FIG. 3 is reached, unless the boom has been turned so that the inner boom assembly I will engage the support bracket 12 of FIG. 1. In that event, further retraction of the hydraulic leg H will cause the bracket lever L to pivot to the down or storage position, while during the latter movement the boom will merely slide along the storage bracket 12.

As illustrated in FIGS. 17 and 18, in the hydraulic leg H, the cylinder 64 may be provided with hose connections 91 and 91', while a piston rod 92 may be disposed within the cylinder 64 and provided at its inner end with a piston 93, the latter being provided with suitable piston rings 94, such as shown, preferably disposed at a position spaced from each end of piston 93 so that hydraulic fluid supplied to connection 91 or 91' will readily move the piston from either end. The outer end of piston rod 92 extends through a seal, such as of the O-ring type, mounted on an annular plate 95 which closes the outer end of cylinder 64, while end plate 95 may also carry a series of inwardly extending stops 96, adapted to limit the outward movement of piston 93. As also shown in FIG. 18, at its outer end, piston rod 92 may be provided with a bearing collar 97 attached to a bearing sleeve 98, as by welding, in turn removably attached to the end of piston 92, as by a removable pin 99. Sleeve 98, of course, receives pin 19 of FIGS. 1 and 2.

As illustrated in FIG. 19, the outer end of the boom outer cylinder 13 may be provided with a ring 105 which may be attached by bolts 106 thereto, the ring 105 being circular on the inside and circular around its outer edge except for a pair of projections 107 to which longitudinally extending gussets 108 may be welded and also to the outside of cylinder 13, for supporting a suitable number, such as two spaced pairs, of pins 109, for rollers 110 adapted to engage the underside of an outer cylinder 111 of the inner boom assembly I, to reduce friction when the inner boom assembly I is moving inwardly or outwardly in the boom outer cylinder 13. As illustrated in FIGS. 19 and 20, the inner boom assembly I may be provided at its inner end with a generally arcuate reinforcing plate 112 to which a suitable number, such as two pair, of spaced brackets 113 may be welded and to the inside of the outer cylinder 111 of the inner boom assembly I, each bracket 113 having an outwardly extending portion 114 disposed within a slot 115 in the cylinder 110, each pair of brackets 113 supporting a pin 116 carrying a roller 117, extending through the slot 115 and into engagement with the inner surface of outer boom cylinder 13. As will be evident, the engagement of rollers 117 with the inside of outer boom cylinder 13 is disposed opposite the engagement of rollers 110 with the outside of inner boom cylinder 111, so that the inner boom assembly I will move relatively smoothly and readily, inwardly and outwardly with respect to the outer boom cylinder 13. As in FIG. 20, at its outer end, cylinder 111 of the inner boom assembly may be provided with a pair of the sheave brackets 17, within which a sheave 120 for a hoisting cable 16 may be journalled on a tubular shaft 121, conveniently locked in position, as by a cotter pin as shown, to one of a pair of collars 122 which are attached to and extend outwardly from each bracket 17. Each collar 122 may be reinforced by a gusset 123, while a guide bolt 124 for the hoisting cable may extend between brackets 17 at the outer ends thereof.

The outer end of cylinder 111 of the inner boom assembly I may be closed by a circular plate 125 which may be welded thereto and on which may be mounted, as by welding, an arm 126 to which may be attached the lower half 127 of a clamp for a tubular mounting shaft 128 for the workman's cage or platform C. The clamp lower half 127 may be attached, at its opposite edge, as by welding, to plate 125, while the upper half 129 of the clamp may be pivoted to the lower half, at the lower edges thereof, by a hinge 130 and a hinge pin 131 therethrough, alternate segments of hinge 130 being attached, as by welding, to the lower half 127 of the clamp and an appropriate number thereof to bracket 126, with the remaining segments of hinge 130 being attached to the upper half 129 of the clamp along their upper edges. The halves 127 and 129 of the clamp may be removably attached together, as by bolts as shown, so that the upper half 129 of the clamp may be disconnected and the shaft 128, which may form part of a yoke for the workman's cage or platform, shown in FIG. 28 and described later, may be removed along with the workman's cage C.

A short tube 132, reinforced by gussets 133, may also be mounted on the inside of plate 125 in a central position, for the purpose, as in FIGS. 21 and 22, of receiving the outer end of a piston rod 134, being attached thereto by a pin 135, while an access hole 136, as in FIG. 20, covered by a removable cover plate 137, permits access thereto. The inner end of piston rod 134 is, of course, provided with a suitable piston of a conventional nature and therefore not shown, while a stop 138, as in FIG. 20, may be attached to cylinder 111 adjacent its inner end. As in FIG. 21, piston rod 134 extends into a cylinder 140, attached at its inner end to a supporting cylinder 141 which, at its inner end, may be attached to an inner end plate 142 for boom outer cylinder 13. End plate 142 may be reinforced by gussets 143, which may be attached to cylinder 141, and also to a ring 144, these attachments, as well as the attachment of end plate 142 to ring 144, being in a suitable manner, as by welding. Ring 144 may be removably secured to the end of boom outer cylinder 13, as by bolts 145, while end plate 142 may be provided with suitable holes, through which pass pipes 146 and 147, which extend alongside cylinder 140 to points of connection therewith.

At its outer end, cylinder 140 may be provided, as in FIGS. 21 and 23, with a reinforcing ring or flange 148 and a four-armed cross 149, which may be secured to flange 148 by bolts, as shown. A suitable seal for piston rod 134 may be mounted in ring 148, while the outer end of each arm of cross 149 may be arcuate, so as to conform to the inside of cylinder 111 and thereby also guide cylinder 111 when piston rod 134 is extended or retracted. As in FIG. 21, in addition to gussets 108, pins 109 and rollers 110 adjacent its outer end, inwardly therefrom the outer cylinder 13 of the boom B may be provided with the brackets 18 between which extend a pin 150 for a sheave 151 for the hoist cable 16 and also pin 19, engaged by bearing collar 97 of the hydraulic leg H, shown in FIG. 17. Pin 19 extends laterally through outwardly extending collars 152, each of which may be reinforced by a gusset 153.

Figure 24:
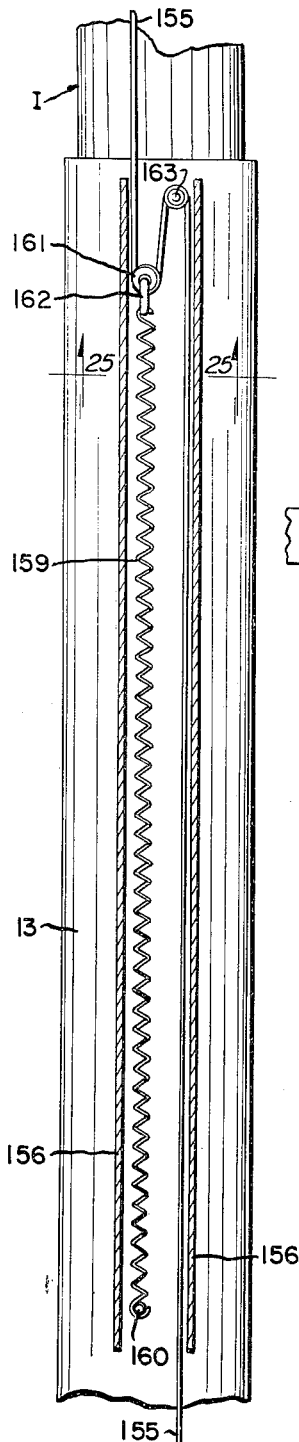
FIG. 24 is an enlarged, fragmentary longitudinal section taken along the top of the boom, at line 24—24 of FIG. 2.
Figure 25:
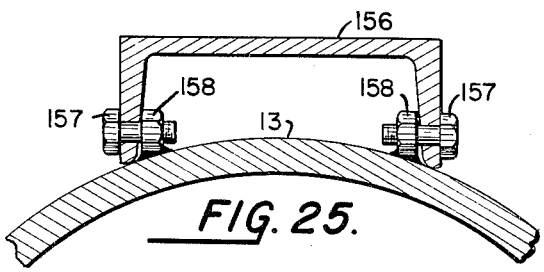
FIG. 25 is a fragmentary cross section, on an enlarged scale, taken along line 25—25 of FIG. 27.

Provision may also be made for running a control cord to the workman's cage C, such as the cord 155 of FIG. 24, and particularly to provide a take-up device for lengthening and shortening the cord as the inner boom assembly moves outwardly or inwardly. The take-up device may be housed in a channel 156 of FIGS. 2 and 24, the channel being inverted, placed atop the outer cylinder 13 and removably attached thereto in a suitable manner. As in FIG. 25, channel 156 may be removably attached to the upper surface of cylinder 13 by a series of cap bolts 157, each extending through a suitable hole drilled in a side flange of channel 156 and engaging a nut 158, with the nuts 158 being welded to the top of the cylinder 13 at spaced positions. The take-up device may include a coil spring 159 of FIG. 24, adapted to be stretched to a length several times its normal length, such as shown in the extended position of FIG. 24. The cord 155, as in FIG. 1, may extend from the superstructure S, between the sides of bracket lever L and through a suitable hole in one of the brackets 84 and thence within channel 156. The inner end of the coil spring 159 may be attached to a pin or lug 160, in turn attached to the exterior of cylinder 13 within channel 156, adjacent the inner end of the latter, while a pulley 161, over which the control cord 155 passes, may be attached to the outer end of spring 159, as by a clevis 162. A pulley 163 may be mounted on the cylinder 13, within channel 156, adjacent the outer end thereof, so that as the inner boom assembly I is extended or retracted, the spring 159 will pull the cord 155 within the channel 156, to the extent necessary to maintain the cord 155 taut. Thus, the cord 155 will not become slack and the possibility of damage thereto is minimized.

Figure 26:
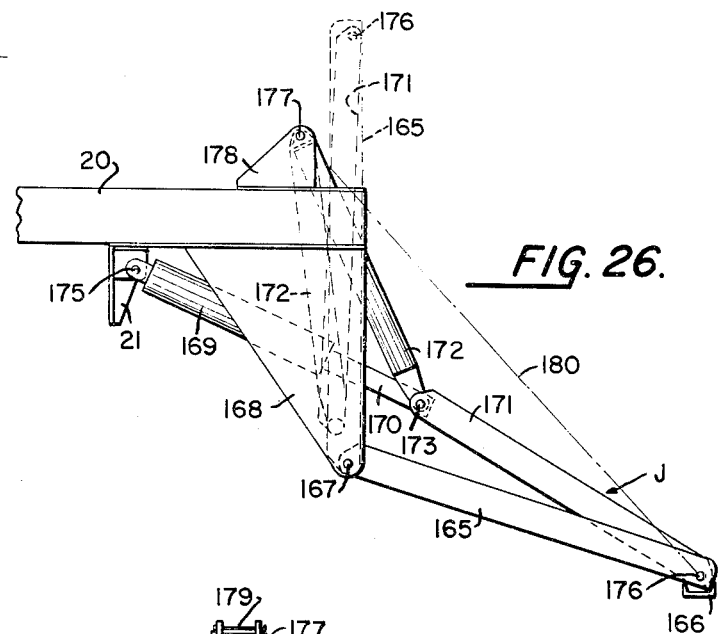
FIG. 26 is a fragmentary rear elevation of a jack leg in extended position and certain associated parts, the retracted position of the jack leg being shown in dotted lines in FIG. 26 and in full in FIG. 1.
Figure 27:
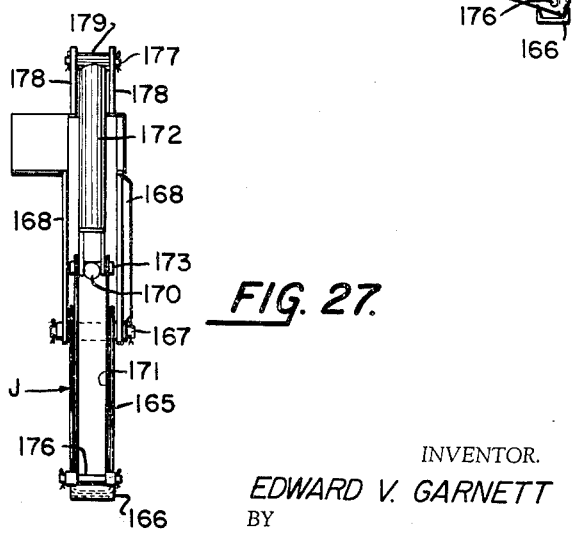
FIG. 27 is a side elevation of the jack leg of FIG. 26 in extended position.

As in FIGS. 26 and 27, each jack leg J may include an arm 165 such as formed by a channel, provided at its outer end with a pad 166 adapted to engage the ground when the jack leg is in the down position shown. The inner end of the arm 165 may be pivoted on a pin 167 extending between a pair of brackets 168, depending from the base 20 of the superstructure S. Each respective jack leg may be actuated by a hydraulic cylinder 169 provided with a piston rod 170, the outer end of piston rod 170 being pivotally connected to both the inner end of a lower link 171 and the outer end of an upper link 172, as by a pin 173, and the inner end of cylinder 169 being pivotally connected to bracket 21, which depends from the base 20 of the superstructure S, as by a pin 175. Lower link 171, which may be a channel having a lesser width than the channel flanges of arm 165 and thereby adapted to fit within the same when in the retracted or dotted position of FIG. 26, which is also the full position of FIG. 5, may be pivotally connected at its outer end to the outer end of arm 165 by a pin 176. Upper link 172, which may be tubular but bifurcated at its outer end, may be pivoted at its inner end by a pin 177 extending between brackets 178 mounted atop base 20 of the superstructure S. For the latter purpose, the inner end of upper link 172 may be provided with a bearing sleeve 179 surrounding pin 177. Suitable hoses may lead from the superstructure S to the hydraulic cylinder 169 to supply hydraulic fluid to the respective ends of the cylinder. As will be evident from FIG. 5, each jack leg J may be similar but complementary in construction.

As will be evident, when piston rod 170 is extended to the full position of FIG. 26, the arm 165 will be moved downwardly until pad 166 engages the ground. Also, a slight additional extension of piston rod 170 will cause links 171 and 172 to extend more nearly in a straight line, indicated by the dot dash line 180 of FIG. 26, so that forces transmitted from the vehicle to the ground will be resisted by the straight arm 165 and by the straightened or almost straightened links 171 and 172. Thus, the only force necessary for the hydraulic fluid in cylinder 169 to resist is the component of force tending to buckle the links 171 and 172 which, when links 171 and 172 are in line, is relatively small. When piston rod 170 is fully retracted, links 171 and 172 will form a small acute angle therebetween, with link 171 being received in arm 165 and link 172 being partially received in link 171, as in the dotted position of FIG. 26 and the full position of FIG. 5. Thus, in storage position, each jack leg will be very compact. As will be evident, when a jack leg J is moved to the down or extended position of FIGS. 26 and 27, as also shown in FIGS. 2 and 4, either or both will engage the ground, at a point spaced a sufficient distance laterally from the body of the vehicle that any tendency for the vehicle to overturn, upon the imposition of a heavy load upon the derrick when operating at one side of the vehicle, will be overcome. It will be noted that such vehicles are normally provided with springs, but that the jack legs engage the ground positively and when both jack legs are down, the superstructure S is supported positively from the ground. As will also be evident, with each jack leg in the retracted position shown in dotted lines in FIG. 26 and also in FIGS. 1 and 5, the jack legs will be disposed within the space between cab 10 and body 11 and will not add additional width to the vehicle.

As in FIG. 1, a pair of hoses 182 and 182' may lead from the superstructure S to the respective ends of the cylinder of hydraulic leg H, while a pair of hoses 183 and 183' may lead from the superstructure S to the inner end of the boom B. As in FIG. 5, the control assembly O may be provided with a series of control levers, such as a control lever 185 for actuating the left-hand jack leg, a control lever 186 for actuating the right hand jack leg, a control lever 187 for raising and lowering the boom, a control lever 188 for rotating the derrick in either direction, a control lever 189 for extending and retracting the inner boom assembly, a control lever 190 for the winch reel 36 and a control lever 191 for a hydraulic digger or the like. As will be evident, the elevation, rotation and extension or retraction of the boom, extension or retraction of the hoist cable, extension or retraction of the jack legs, as well as a digger or other hydraulically actuated device, may be controlled by an operator positioned at the control assembly O. Preferably, control levers 185 to 191, inclusive, are movable in opposite directions, such as forwardly and rearwardly, to actuate suitable control valves for supplying pressure under fluid to and draining fluid from the various hoses and lines described before. Also, the valves controlled by levers 187, 188 and 189 may be solenoid operated and controlled by wires extending through control cable 155, so that a small cubical control box may be mounted at the end of the control cable 155 and operated by the workman occupying cage C. A cubical control box is of advantage, since it may include push button switches and the push buttons may be disposed on each of the eight sides of the cube, so that a workman may push a button in the direction he wishes the cage to move. Thus, if the workman wishes to have the cage move up or down, he need only to push the respective top or bottom button, to cause the boom to be raised or lowered by the hydraulic leg H; or push one or the other of the side buttons to cause the boom to be rotated in the desired direction, i.e., to cause the cage to be moved to one side or the other; or push the front or rear button to cause the boom to be extended or retracted, i.e., to cause the cage to be moved inwardly or outwardly. The side buttons may control the valves which may otherwise be actuated by the control lever 188, the top and bottom buttons may control the valves which may otherwise be actuated by control lever 187, while the front and back buttons may control the valves normally controlled by the control lever 189. It will be understood that the cage may be controlled in any other suitable manner. As will be evident, the derrick may be controlled from either the ground, at the control box O, or from the workman's cage.

The workman's cage or basket C may be supported by the shaft 128 of FIG. 20, with which may be associated a yoke which may, as in FIG. 28, include a pair of semi-circular brackets 195 and 196, disposed adjacent opposite ends of the shaft 128 and adapted to engage the shaft at each side of the lower clamp 127 of FIG. 20. The upper clamp 129 of FIG. 20 may extend the full distance opposite the bracket 195, lower clamp 127 and bracket 196, while each bracket 195 and 196, as well as upper clamp 129, may be provided with flanges 197, as shown also in FIG. 29, by which the respective parts may be bolted together. On each bracket 195 and 196 may be mounted a tubular arm 198 extending generally radially therefrom, rearwardly alongside and generally parallel to cylinder 111 of FIG. 20, while each arm may be provided at its outer end with a circular cap 199, adapted to support a bracket 200 provided with a pin 201, engaged by a spring for a purpose described later and provided with an end flange 202 to insure that the spring does not slip off the pin. The arms 198 are conveniently welded to the brackets 195 and 196, while the caps 199 and brackets 200 are also conveniently attached to the respective parts by welding. The workman's cage or basket C is attached to the opposite ends of shaft 128, in a manner described later, but provision is made to lock shaft 128 in position and also to permit shaft 128 to be turned to different positions within the clamps 127 and 129 and brackets 195, 196. For this purpose, as shown in FIGS. 29 to 31, one of the arms 198, such as the arm attached to bracket 195, may be provided with a right angled slot 203 through which extends a handle 204 of a rod 205 provided at its opposite end with a plug or stop 206. The latter extends through a hole 207 in bracket 195 and also through a hole 208 in shaft 128, as in FIG. 31, when the workman's cage or basket C is in the use position, such as shown in dotted lines in FIG. 2, and is adapted to extend through a diametrically opposite hole in shaft 128 when the cage C is in storage position, shown in full in FIG. 2. Plug 206 and rod 205 may extend longitudinally within a housing 209 provided with an end cap 210, through which rod 205 also extends, with a compression spring 211 bearing between the end of plug 206 and cap 210, to press plug 206 inwardly and maintain it within the desired hole in shaft 128. When the cage C is to be moved from use to storage position, or vice versa, handle 204 of rod 205 may be moved from the position of FIG. 30 to the right angle portion of slot 203, which will cause plug 206 to be withdrawn from hole 208 or the corresponding hole on the opposite side of shaft 128, whereupon cage C can be moved through 180° or any other appropriate angle. As soon as cage C has reached the desired position, handle 204 may merely be shifted to the longitudinal portion of slot 203, whereupon spring 211 will move plug 206 into the desired hole.

The workman's cage or platform C, as illustrated in FIGS. 32, 33 and 34, may be supported by a pair of arms 215 connected, as by brackets or caps 216, at their inner ends to the opposite ends of shaft 128, the latter being shown also in FIG. 20. Outside of the opposite ends of upper clamp 129, shaft 128 may be provided with arms 217 and 218, respectively, as in FIGS. 32 and 33, conveniently welded to the shaft and in alignment with the respective pin 201 so that a spring 219 may be attached at one end to pin 201 and at the opposite end to the respective arm 217 or 218. The springs 219 tend to move the cage and particularly the shaft 128, from either the storage or use position to an intermediate position, thus assisting the operator in shifting the cage from one position to the other. It will be noted that the storage and use positions of arms 215 for the workman's cage C are conveniently disposed at 180° to each other, as will be evident from the full and dotted positions of the arms 215 in FIG. 2. When not needed, the workman's cage or platform may be removed from the boom, as by detaching the upper clamp half 129 of FIG. 20 from the lower clamp half 127, as with the workman's cage in extended position and resting on the ground, as in the dotted position of FIG. 4. When so detached, the entire workman's cage C and yoke may be lifted by the cable 16 and placed in the body of the vehicle, or at any other desired location.

Arm 215 is conveniently made of plywood with a fiberglass covering, or may be made of any other suitable material, to which inner bracket or cap 216 may be attached, as by bolts 220 and an outer cap 221 attached at the opposite end, as by bolts 222. Each cap 221 may be provided with a bearing for a pin 223, for pivotal movement of the cage, each pin 223 extending outwardly from a mounting block 224 through a spacing collar 225. A washer 226 may be provided on each pin 223, outside cap 221, with a cotter pin or similar device exteriorly thereof. Each mounting block 224 may be disposed at one side of a rectangular upper frame 227, conveniently formed of tubular members attached solidly together, as by welding, while at each side a reinforcing strut 228, conveniently tubular, may be welded at its opposite ends to the upper frame 227 and extend over the mounting block 224, as shown in FIG. 33. A solid rectangular lower frame 229, also conveniently formed of tubular members, may be provided with a mesh or perforated floor 230, as indicated in FIG. 32. The upper and lower frames may be connected at the front and rear by pairs of vertical struts 231 and 232, conveniently also tubular and reinforced by cross bars 233, as in FIG. 34. The upper and lower end of each strut 231 and 232 may be attached, as by welding, to a sleeve 234 which respectively pivots on the front or rear member of the upper or lower frame 227 or 229. When in extended or use position, the upper and lower frames may be held apart by an angle brace at one side, conveniently comprising tubes 235 and 236 of different diameters, so as to be slidable one within the other, and respectively pivotally attached to the upper and lower frames, as by pivotal connections at respective upper and lower brackets 237 and 238, each of which is conveniently forked so that a pivot pin 239 may extend therethrough. The structure may be further reinforced by a bar 240 at each side, which may be removably attached, as by bolts, to the respective upright struts 231 and 232.

A locking device may be mounted at a hole 241 in tube 235, tube 236 being provided with a hole which coincides with hole 241 and engaged by the locking device when the cage is in extended or use position, and also with another hole, at the upper end of tube 236, for engagement by the locking device in storage position. When the side bars 240 are removed and the tube 236 is pulled outwardly in tube 235, the lower frame 229 can be pivoted in a clockwise direction, as viewed in FIG. 33, and moved to a position rearwardly of the upper frame 227. For folding to storage position, locking plug 206 of FIGS. 29-31 is disengaged, in the manner previously described and shaft 128, together with arms 215, is pivoted around until arms 215 lie above the outer end of the inner boom assembly I, as in FIG. 1, so that the upper frame 227 and lower frame 229 will assume the position shown, with the struts 231 and 232 still connecting the same. In such position, the locking lug 206 of FIGS. 29-31 will engage an appropriate hole in shaft 128, thus securing the cage in storage position.

The locking device associated with hole 241 in tube 235 of FIG. 33 may be constructed in any suitable manner, such as illustrated in FIG. 35 or in FIG. 36. Thus, as in FIG. 35, a locking bolt 245 may extend through hole 241 in tube 235 and also through a hole 246 in tube 236, when the tubes are in locked position. Locking bolt 245 may be provided with a handle 247 at its outer end and a flange 248, spaced from its inner end, conveniently formed by a washer welded thereto and adapted to bear against a spring 249. The opposite end of spring 249 bears against an outer end cap 250 of a tubular housing 251, the latter also being conveniently provided with an inner end cap 252 and conveniently welded to the tube 235, with end cap 250 also being conveniently welded to the housing while spring 249 is compressed, so that a lock bolt assembly may be formed prior to attachment to the outside of tube 235 around hole 241, as by welding. As will be evident, spring 249 will maintain lock bolt 245 in engagement with holes 241 and 246, unless it is pulled outwardly by its handle 247.

In the alternative locking device illustrated in FIG. 36, a pin 255 may be provided at its outer end with a transverse handle 256, conveniently formed merely by bending the end of the pin around, and at its inner end with a cylindrical block 257 adapted to engage the holes 241 and 246 of FIG. 35. A spring 258 bears against block 257 at one end and at the opposite end against an end cap 259 of a tubular housing 260, the inner end of which may be welded to the tube 235 of FIG. 33 around hole 241. An inner end cap for housing 260 is unnecessary, since handle 256 forms a stop for the pin 255 and also extends laterally from housing 260, so that it may be readily grasped. When the locking device of FIG. 36 is being assembled, the pin 255 may be inserted through the end cap 259, previously attached to housing 260, the spring 258 inserted and the block 257 inserted over the inner end of pin 255 and clamped, so that the spring will be held in compression while the pin 255 is welded to block 257, at the inner end thereof. As will be evident, any other suitable type of locking device may be used.

It may sometimes be desirable to prevent the workman's cage or platform from swinging, as during certain movements, but at other times permit it to swing so as to remain in an upright position. For this purpose, the braking pivot of FIG. 37, with which may be associated the wing nut of FIG. 38, may be used. As in FIG. 37, a modified mounting block 224' may be provided with a pin 223' having threads 263 at its outer end. Block 224', as before, may be mounted between upper frame 227 and reinforcing strut 228, but may be additionally reinforced by plates 264, on the inside or outside, or both as shown. Block 224' may also be provided with an outer flange 265 to which is attached a friction disc 266 of suitable material, such as normally used for brakes. In this instance, collar 225 of FIG. 32 may be omitted, while the smooth portion of pin 223' engages the bearing carried by the inner cap 221 for the respective arm 215, or the collar 225 of FIG. 32 may be attached to cap 221 and the bearing for pin 223' extend therewithin. Thus, the friction disc 266 will engage the inner surface of cap 221, or the inner surface of collar 225 when affixed to the cap, which surface may be forced against the friction disc by tightening a nut 268 of FIG. 38 on the threads 263 of pin 223', nut 268 being tightened against the outside of cap 221, such as against washer 226 of FIG. 32. For readier adjustment of nut 268, an angular handle 269 may be welded to each of the opposite sides thereof, with a flat reinforcing strip 270 welded to each opposite side of the nut and the respective handle. As will be evident, the nut 268 may be adjusted to provide considerable friction when the carriage tends to swing, as when the workman wishes a solid support to work from, but may be loosened to permit the carriage to shift and remain upright when the cage is being moved to a different position.

From the foregoing, it will be evident that a derrick and a workman's cage or platform constructed in accordance with this invention, fulfill to a marked degree the requirements and objects hereinbefore set forth. By providing a turntable atop a superstructure, the derrick can be rotated through a full 360°, while a relatively narrow superstructure, which may be placed between a cab and the body of the vehicle, for instance, will occupy a minimum of otherwise useful space. Also, by providing a bracket lever which is pivoted upwardly when the boom is raised, the pivot point of the boom can be placed at an elevation above the superstructure such that the boom during use will clear the usual parts of the truck, such as the cab and the body. Also, the bracket lever, which is collapsed or moved to a lower position when the boom is moved to storage position, permits the boom to extend to a minimum height above the vehicle when in storage position. By the use of an extensible and retractable inner boom assembly, the operating length of the derrick can be increased, while the use of a hydraulic leg, extending between an outer boom cylinder and the turntable, permits the boom to be raised and lowered to various angular positions. By the use of means which is conveniently associated with the hydraulic leg and which automatically locks the boom supporting bracket lever in its upright position, when the hydraulic leg is raised to a predetermined position, such as when the boom is horizontal or at any angle above the horizontal, collapse of the bracket lever is prevented when a rearward force is exerted on the boom, particularly with the boom raised to a higher elevation or angular position. By the use of a turntable having a depending cylinder in conjunction with upper and lower assemblies which are provided with bearings engaging the cylinder to receive the lateral thrust, the thrust in opposite directions may be counteracted at points spaced apart vertically sufficiently that the boom may be used to handle comparatively heavy loads with ease, as well as to be moved while under load through any desired degree. By extending the cable centrally through the turntable, the boom may be swung through a full 360° without undue complications in the winch and cable assembly. By the use of jack legs pivotally mounted at each side of the superstructure, the superstructure may be solidly supported from the ground, at each side of the vehicle, so that comparatively heavy loads may be handled at either side of the vehicle. The collapsible workman's cage or platform, which may be stored atop the boom, permits the boom to be used for hoisting purposes while the workman's cage is in storage position, but the workman's cage is readily available for use when necessary. A collapsible workman's cage is also of particular advantage, since in storage position, it will occupy a minimum of space and can lie flat atop the boom. Also, the workman's cage may be readily removed from the boom when a considerable amount of hoisting, with the cage being unnecessary, is to be done.

Although a specific embodiment of a vehicle derrick and a collapsible workman's cage or platform has been illustrated and described herein, it will be understood that other embodiments of this invention may exist and various changes may be made therein, all without departing from the spirit and scope thereof.

What is claimed is:

1. A derrick for a vehicle, comprising a support adapted to be mounted in upright position on said vehicle; turntable means mounted on said support for pivotal movement about a generally upright axis; bracket means mounted on said turntable means for movement between a lower and an upper position; boom means mounted on said bracket means for relative movement with respect thereto; means for moving said bracket means between said lower and upper positions and for moving said boom means; and means for automatically locking said bracket means in its upper position relative to said bracket means.

2. A derrick for a vehicle, comprising a support adapted to be mounted in upright position on said vehicle; turntable means mounted on said support for pivotal movement about a generally upright axis; bracket means mounted on said turntable means for movement between a lower position extending generally laterally from said turntable means and a generally upright position; extensible and retractable boom means mounted on said bracket means for relative movement with respect thereto, said boom means being mounted adjacent one end on said bracket means and being extensible and retractable at the opposite end; means for maintaining said bracket means in said generally upright position; and means for moving said bracket means between said lower and upright positions and for moving said boom means relative to said bracket means.

3. A derrick for a vehicle, as defined in claim 2, wherein said boom means is extensible and retractable independently of the movement of said bracket means.

4. A derrick for a vehicle, as defined in claim 2, wherein said boom means is pivotally mounted on said bracket means.

5. A derrick for a vehicle, as defined in claim 4, wherein said bracket means is pivotally mounted on said turntable means about an axis generally transverse to the axial movement of said turntable means.

6. A derrick for a vehicle, as defined in claim 5, wherein means for moving said boom means and said bracket means are pivotally mounted on said turntable in opposed positions.

7. A derrick for a vehicle, as defined in claim 1, wherein said means for locking said bracket means in said upper position includes a hook and an opening in said bracket means engageable by said hook at a plurality of positions of said hook.

8. A derrick for a vehicle, comprising a support adapted to be mounted in upright position on said vehicle; turntable means mounted on said support for pivotal movement about a generally upright axis; bracket means having an opening therein and mounted on said turntable means for movement between a lower and an upper position; boom means mounted on said bracket means for relative movement with respect thereto; means connected to said boom means and pivotally connected to said turntable means, for moving said boom means relative to said bracket means and for moving said bracket means between said lower and upper positions; and a hook for locking said bracket means in said upper position by engagement in said opening of said bracket means.

9. A derrick for a vehicle, as defined in claim 2, wherein said turntable means is centrally hollow; including a winch disposed below said turntable means; and a cable extending from said winch through said turntable means and along said boom to the outer end thereof.

10. A vehicle derrick, comprising supporting means adapted to be mounted in a generally upstanding position on said vehicle; turntable means mounted on said supporting means for rotation about a generally upright axis; a pair of brackets pivotally mounted in laterally spaced relation on one side of said turntable means, each said bracket having generally the form of a right triangle with the pivotal mounting of said bracket on said turntable means being at a position corresponding to the right angle corner of said triangle, each said bracket being movable between a position in which said bracket extends laterally from said turntable means and a position in which said bracket is generally upright and the portion of said bracket corresponding to the base of said triangle rests on said turntable means; a boom pivotally mounted on both of said brackets at a position corresponding to the upper apex of said triangle and adapted to be disposed between said brackets with said brackets in said lower position; and extensible and retractable means pivotally connected between said boom and said turntable means, the latter connection being disposed opposite the pivotal connections between said brackets and said turntable means.

11. A derrick for a vehicle comprising supporting means adapted to be mounted in upright position on said vehicle; turntable means mounted on said supporting means for rotation about a generally vertical axis, said turntable means including a hollow depending cylinder disposed about said generally vertical axis; said supporting means including upper bearing means for supporting said turntable means for rotation about said generally vertical axis and for receiving the lateral thrust of said cylinder in any position thereof; said supporting means also including lower bearing means, disposed beneath and in vertically spaced relation to said upper bearing means, for receiving the lateral thrust of said cylinder in any position thereof; bracket means pivotally mounted about a longitudinal axis on said turntable means, said bracket means being movable between a lower position and an upper position; a boom mounted for upward and downward movement on said bracket means, said boom being pivotal about a generally horizontal axis spaced laterally from the vertical axis of said cylinder; means for turning said cylinder and said turntable means, bracket means and boom therewith; a winch mounted within said supporting means and beneath said cylinder; a cable extending from said winch and upwardly through said hollow cylinder and thence along said boom; a sheave disposed at least partially within said cylinder and engaged by said cable; and extensible and retractable means connected between said boom and said turntable means, the connection between said extensible and retractable means and said turntable means being laterally spaced from the axis of said cylinder and opposite the pivotal axis of said boom.

12. A derrick for a vehicle, as defined in claim 11, wherein said bracket means comprises a pair of brackets, each having the general form of a right triangle and each said bracket is pivotally mounted on said turntable means adjacent the right angle of said triangle, said brackets being mounted in spaced parallel relation and said boom being pivotally mounted between said brackets adjacent the outer ends thereof; one of said brackets having an opening in the portion thereof corresponding to the hypotenuse of said triangle; and a hook movable by said extensible and retractable means to engage said opening upon movement of said boom to and above a predetermined position, so as to lock said bracket means in said upper position.

13. A derrick for a vehicle, comprising a support adapted to be mounted in upright position on said vehicle; turntable means mounted on said support for pivotal movement about a generally upright axis; bracket means mounted on said turntable means for movement between a lower and an upper position; boom means mounted on said bracket means for relative movement with respect thereto; means for moving said bracket means between said lower and upper positions; means for moving said boom relative to said bracket means, and locking means responsive to movement of said boom moving means for locking said bracket in said upper position.

14. A derrick for a vehicle, as defined in claim 13, wherein said locking means engages said bracket only after a predetermined movement of said boom moving means.

References Cited in the file of this patent

UNITED STATES PATENTS

| | | |
|---|---|---|
| 2,025,284 | Huot | Dec. 24, 1935 |
| 2,381,731 | Erdahl | Aug. 7, 1945 |
| 2,462,926 | Wilson | Mar. 1, 1949 |
| 2,538,000 | Hoar | Jan. 16, 1951 |
| 2,606,078 | Brock | Aug. 5, 1952 |
| 2,616,768 | Stemm | Nov. 4, 1952 |
| 2,668,625 | Garland | Feb. 9, 1954 |
| 2,674,500 | Hukari | Apr. 6, 1954 |
| 2,740,538 | Felkner | Apr. 3, 1956 |
| 2,777,586 | Boysen | Jan. 15, 1957 |
| 2,787,383 | Antos | Apr. 2, 1957 |
| 2,833,422 | Ferwerda | May 6, 1958 |
| 2,911,111 | Grove | Nov. 3, 1959 |

FOREIGN PATENTS

| | | |
|---|---|---|
| 1,117,129 | France | Feb. 20, 1956 |

UNITED STATES PATENT OFFICE
CERTIFICATE OF CORRECTION

Patent No. 3,056,510            October 2, 1962

Edward V. Garnett

It is hereby certified that error appears in the above numbered patent requiring correction and that the said Letters Patent should read as corrected below.

Column 10, line 49, for "eight" read -- six --; column 14, line 54, after "means" insert -- relative to said bracket means --; line 56, strike out "relative to said bracket means".

Signed and sealed this 30th day of April 1963.

(SEAL)
Attest:

ERNEST W. SWIDER
Attesting Officer

DAVID L. LADD
Commissioner of Patents